May 8, 1934. P. B. RENFREW ET AL 1,958,394
FILTERING APPARATUS
Original Filed July 20, 1928  3 Sheets-Sheet 1
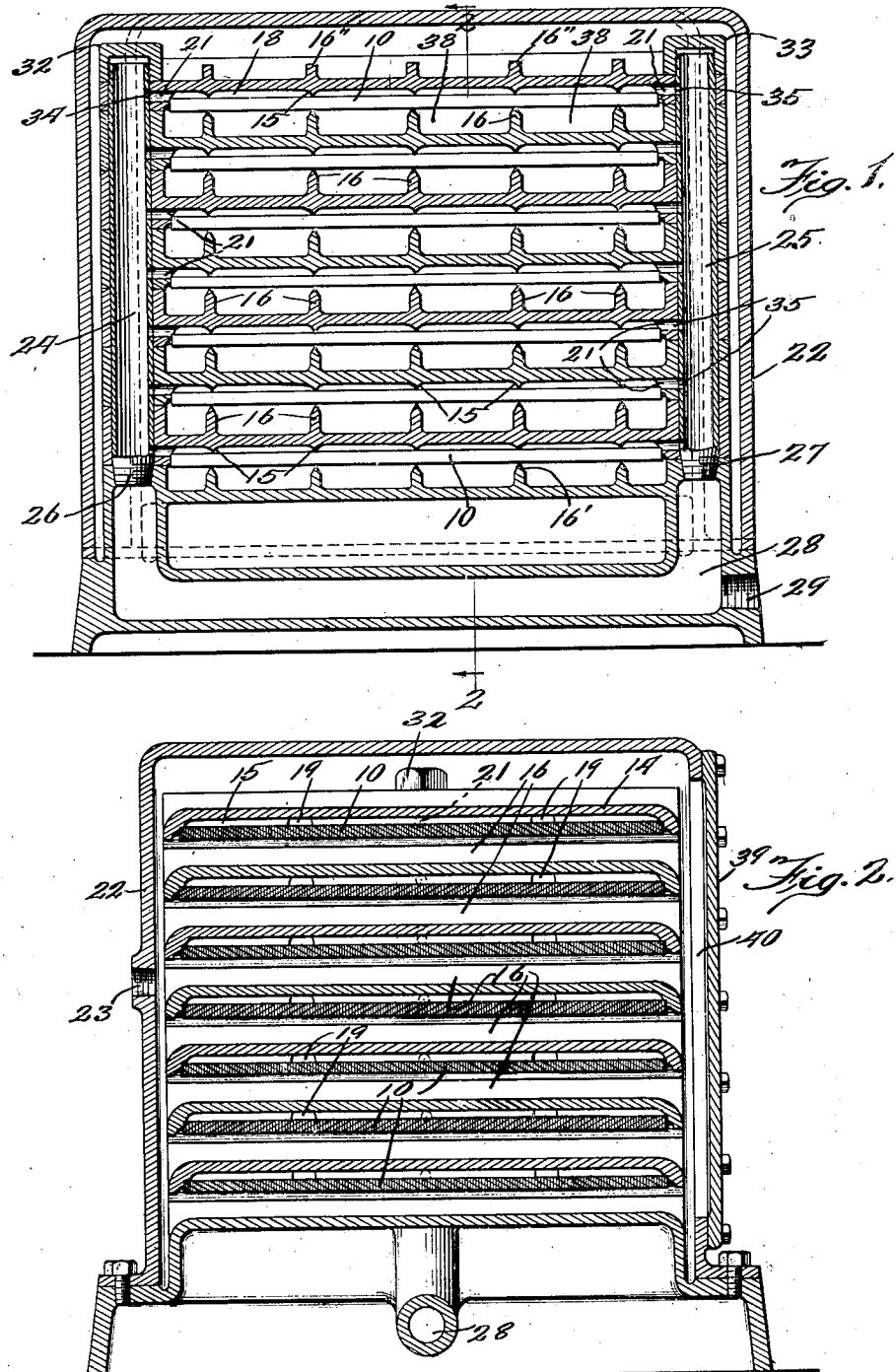

May 8, 1934.　　P. B. RENFREW ET AL　　1,958,394
FILTERING APPARATUS
Original Filed July 20, 1928　　3 Sheets-Sheet 3
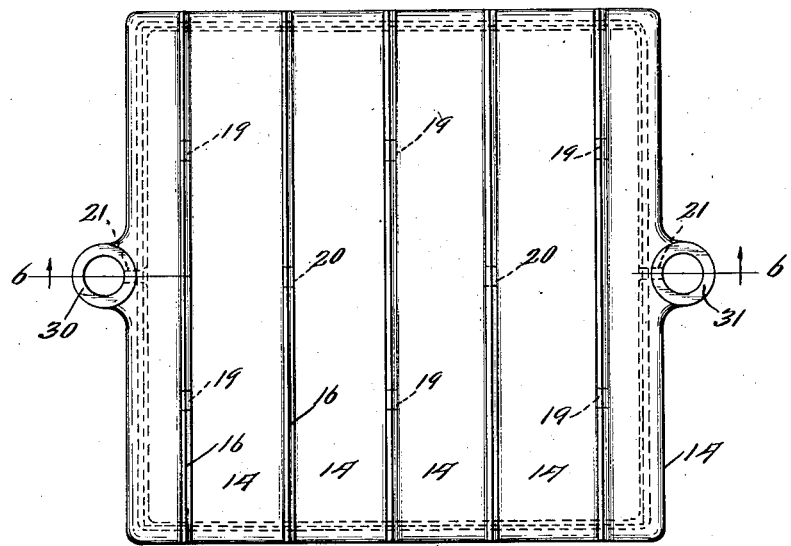
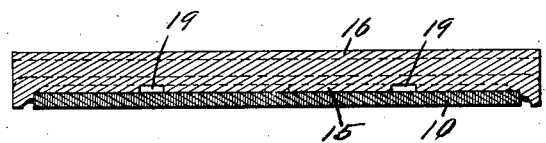
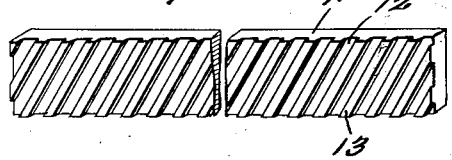

Patented May 8, 1934

1,958,394

UNITED STATES PATENT OFFICE 1,958,394

FILTERING APPARATUS

Paul B. Renfrew and Lee R. Hartley, Fort Wayne, Ind., assignors to S. F. Bowser & Company, Inc., Fort Wayne, Ind., a corporation of Indiana Application July 20, 1928, Serial No. 294,212
Renewed June 17, 1931

20 Claims. (Cl. 210—178)

Our invention relates to filtering apparatus and although it is particularly adapted to the purification of oils, it may have a general application.

One of the objects of the present invention is to provide a very strong and substantial filter element for mechanical filtration purposes which is constructed to provide a multitude of very minute capillary apertures or filtering passages through which the filtrate is adapted to be forced under extremely high pressures.

Another object of our invention is to provide such a type of filter constructed and arranged to withstand extremely high filtering pressures for forcing liquid through the minute capillary passages in either direction.

Yet another object of our invention is to provide a filter of the above character wherein the metallic filtering unit of the edge filter is supported throughout its edge area at spaced-apart intervals by means of supporting members of minute contacting area.

Yet another object of our invention resides in providing a metallic edge filter wherein the filter unit is supported throughout its edge area at spaced intervals by means of knife-edged supports.

Yet another object of our invention resides in supporting the metallic edge-filter unit formed with a multitude of minute capillary filtering passages opening on both sides of its edges, at spaced-apart intervals, by means of supports which present minute contacting and supporting surfaces of sufficient strength to permit fluid to be passed through said capillary filtering passages at extremely high pressures for both the filtering and back-washing operations.

Yet another object of our invention resides in providing a metallic filter of the foregoing character, which is compactly arranged, and wherein the units may be quickly interchanged and replaced; which is quickly adaptable to the back-washing operation for cleaning; which may be manually cleaned in a very facile fashion, and wherein a plurality of such units may be assembled for the purpose of producing a filter of desired capacity, and which may also be quickly altered to accomplish various types of filtering operations.

Yet another object of our invention is to provide a filter comprising a plurality of superimposed or stacked metallic filter ribbons stacked together in edgewise relation and being held in tightly compacted position, each of said ribbons being provided with superficial capillary filtering passages formed by alternate raised cross-ribs and intervening grooves and wherein the cross-ribs are similarly arranged with respect to the ribbons, so that the spaced-apart bars of each ribbon will abut against all the cross-ribs of the next adjacent ribbon, thereby supporting the same and preventing the closing of the channels between the ribbons.

Yet another object of our invention resides in the provision of a simple construction of filter unit including a supporting enclosing rim or frame having a disk-like assembly of metallic ribbon-like laminations pressed together tightly and seated in the rim, and wherein the laminations provide a multitude of microscopic filtering passages, all discharging into an internal passage in the rim.

Yet another object of our invention resides in the particular construction of the rims in combination with the disk-like assembly when mounted therein, whereby when a plurality of units are assembled, the internal discharge passages in the rims of each frame will register to provide a continuous discharge outlet for all the units of the filter.

Other objects of the invention will appear hereinafter, the novel features and combinations being set forth in the appended claims.

Referring to the accompanying drawings—

Fig. 1 represents a sectional elevation of our improved filtering apparatus comprising a plurality of filter units mounted in multiple;

Fig. 2 is a sectional elevation of the filtering apparatus taken on the line 2—2 of Fig. 1, looking in the direction of the arrows;

Fig. 5 is a plan view of one of the filter units;

Fig. 6 is a sectional elevation taken on the line 6—6 of Fig. 5, looking in the direction of the arrows;

Fig. 7 is a sectional elevation taken on the line 7—7 of Fig. 6, looking in the direction of the arrows;

Fig. 8 is an enlarged perspective view of one of the cross-grooved metal ribbon laminations of the stack shown in Fig. 4; and Fig. 9 represents an enlarged perspective view of a modified form of cross-grooved metal ribbon having the spaced ribs arranged at right angles to the edges instead of diagonally, as shown in Fig. 8.

Figure 4:
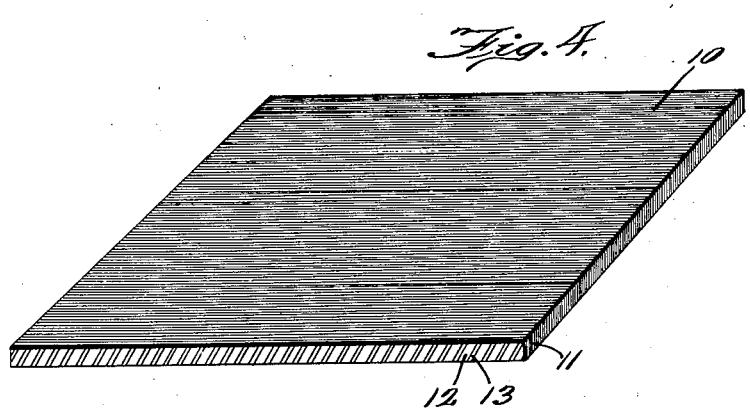
Fig. 4 shows one of the filter elements comprising a stack of rectangular ribbon laminations.

In the accompanying drawings, Fig. 4 shows a filter element 10 consisting of a stack of rectangular laminations of metal ribbon or tape so constructed and stacked as to form a flat porous square or rectangular filter element having a thickness equal to the width of the ribbon or tape. Each rectangular strip of metal ribbon or tape is provided with spaced-apart separators, cross-ribs or cross-bars. Fig. 8 represents an enlargement of one of the laminations, the body being designated 11, the diagonal cross-grooves 12 and the diagonal cross-ribs or cross-bars 13.

It should be understood that the ribbon or tape 11 is thin metal, such as copper or other metal of sufficient strength to permit very compact stacking of the laminations without undue distortion or bending of the metal itself. The cross-ribs or cross-bars 13 may be raised masses of substantially non-compressible material soldered, welded, electrically deposited or plated, or otherwise attached to one side of the ribbon or tape in spaced-apart positions to provide the grooves or channels 12 between the cross-ribs. While we have referred to copper as being the material of which the tape or ribbon is composed, it may be of other material, according to the nature of the liquid to be filtered. Copper is deemed suitable for the filtration of lubricants such as are used on engine bearings. In stacking the laminations the smooth back of each is placed against the ribbed face of the next adjacent lamination. For the purpose of stacking the laminations, they may be assembled in the frame 14 shown in Fig. 6. By inverting this frame the ribbon laminations 11 may be stacked thereon by being mounted to rest on the knife edges 15, 15 which extend entirely across the frame 14 directly under the respective knife edge supports 16, 16, or when the frame 14 is inverted the knife edges 15, 15 will be directly above the knife edges 16, 16 and co-extensive therewith. There being a plurality of such spaced-apart transverse knife edge supports 15, the stacked laminations will extend at right angles to such knife edges and rest against the same. When the laminations have been completely assembled they may be secured to the frame 14 by soldering at 17, 17 at the ends of the rectangular ribbons or tape.

After the laminations have been stacked and secured to the frame 14, rectangular chambers 18, 18 will be afforded between the knife edges 15, 15 against which the filter element 10 in its stacked form is adapted to bear. The rectangular chambers 18, 18 are in communication with each other successively through the openings 19, 19 and 20 in the knife edge partitions 15, 15, as shown in Fig. 5. Fig. 7 is a cross-sectional view of Fig. 6 on the line 7—7, looking in the direction of the arrows, showing clearly the passageways 19, 19 between adjacent chambers 18, 18.

Figs. 5, 6 and 7 show a complete filter unit in position for use, the under side of the filter element 10 being the entrance side for the liquid to be filtered and the upper side of the filter element 10 being the discharge side. The filtered liquid is received in the chambers 18, the ends of which are closed, but which are provided with the outlets 19 and 20 so that the filtered liquid, such as oil, may flow in either or both directions transversely of the knife edges 15, 15 toward the outlet ports 21, 21 shown in Figs. 5 and 6. In other words, the oil received along the central chambers 18, 18 may divide and flow in opposite directions toward the lateral ports 21 on opposite sides of the filter unit.

It will thus be seen that each frame 14 provides a rim portion provided with an inwardly extending passage 21 communicating in turn with the internal passage 18, which receives filtered oil forced under high pressure through microscopic capillary filtering passages formed between adjacent faces of the laminations, and that this internal passage 21 in turn communicates with two internal passages 30 and 31 formed in the rim, and which internal passages are adapted to register when a number of the unit frames are assembled in cooperative relation to provide a built-up multi-unit filter, whereby to provide a continuous discharge passage for the filtered liquid.

While the thickness of the tape or ribbon and the thickness of the spaced cross-ribs may be varied according to conditions and the liquid to be filtered, it is practicable in filtering lubricating oil used for the bearings of Diesel engines to use copper ribbons three-eighths of an inch in width, thirty-six ten-thousandths of an inch in thickness, with the cross-ribs thereon four ten-thousandths of an inch thick and spaced-apart to provide grooves four ten-thousandths of an inch in depth and one-eighth of an inch in width, leaving the cross-ribs aproximately one-sixteenth of an inch in width. The total thickness of a ribbed ribbon or tape, including the cross-ribs, would then be four-thousandths of an inch. It should be understood that we do not wish to be limited to these particular dimensions and that they are specified merely to illustrate the practicability and utility of a porous metal flat laminated filter having such minute passageways between the flat faces of the filter between the edges of the laminations.

If the ribbon or tape has wider channels or grooves 12 than the cross-bars 13 and the latter are equally spaced they may bend the backs of the grooves when the laminations are stacked and compressed compactly together, unless care be exercised in the formation of the spaced ribs on the tape or in the cutting of the predetermined lengths of the laminations. In other words, the laminations should all be identical so that the spaced cross-ribs of each lamination when stacked with the other laminations will be in transverse alinement. This will cause the spaced bars of each lamination to abut against the backs of the next adjacent cross-ribs. Partial closing of the channels or grooves will thereby be prevented, because the bending of the metal backs will be prevented and the porosity of the filter element will be maintained or its through-put maintained by reason of the maintenance of the desired cross-sectional area of the passageways. One of the advantages of the rectangular lamination form of filter element is that the laminations may be stacked with the cross-ribs directly back of the next adjacent cross-ribs. Therefore, when the laminations are all identical as to the arrangement of the cross-ribs and the spacing thereof, the passageways may be made direct between the edges of the filter or at right angles thereto, as shown in Fig. 9. When the laminations are not identical it is preferred to provide the cross-bars in the diagonal arrangement shown in Fig. 8 which tends to prevent bending of the metal backs into the grooves when the laminations are stacked.

While we have printed, plated, soldered, or otherwise attached the separators or cross-ribs 13 diagonally across the tape and in parallelism, as shown in Fig. 8, or straight across the tape 11', as shown in Fig. 9, they may be arranged in various other ways. When the rectangular lengths of laminations 11' shown in Fig. 9 are all exactly the same with the cross-ribs 13' and grooves 12' of each length corresponding exactly to those on all of the other laminations, the grooves may be made wider and the ribs narrower, thus increasing the through-put of the filter element when completed. But in any event, we prefer to equally space the cross-bars and so proportion them that when the laminations are stacked into a flat square or rectangular filter element, as shown in Fig. 4, the multiplicity of passageways will be substantially uniform in cross-sectional area over the entire surface of the filter element on each side thereof and from one face to the other.

Figure 3:
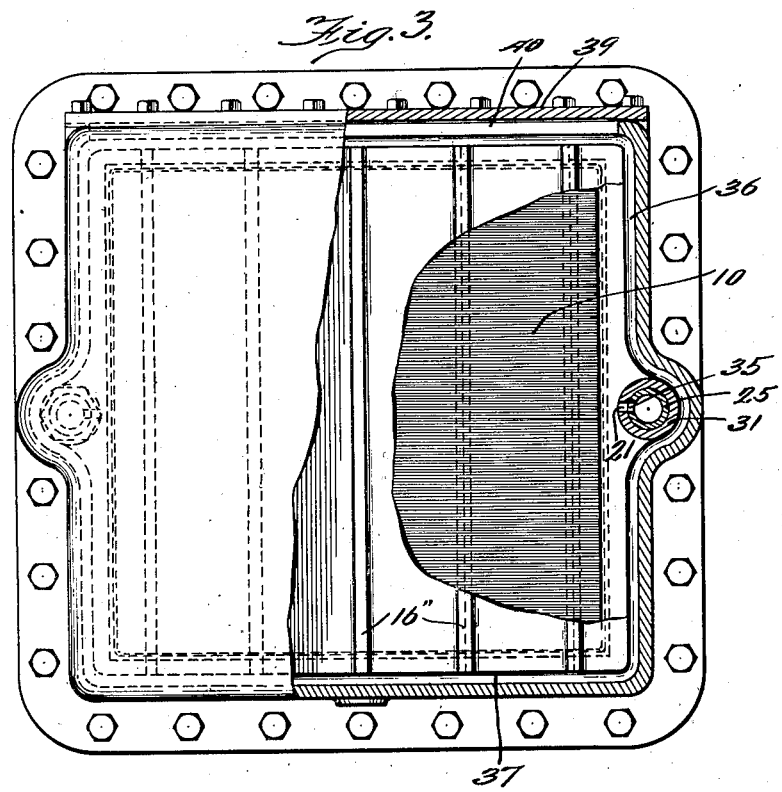
Fig. 3 is a plan view of the filtering apparatus shown in Fig. 1, with certain portions broken away to show the interior construction in plan.

In Figs. 1, 2 and 3, we have shown a casing 22 in which a plurality of such filter elements as that shown in Figs. 5, 6 and 7 may be mounted in multiple to greatly increase the effective area of the filtering apparatus. The inlet port 23 is screw-threaded to receive a pipe for directing the used lubricant into the interior of the casing 22. This casing is entirely closed so that the oil to be filtered may be introduced under pressure.

Mounted inside of the casing 22 are spaced-apart tubular standpipes 24 and 25 screw-threaded at their lower ends 26 and 27 rigidly to the casing 22 so as to be in communication with the lower chamber 28 from which filtered oil may be directed to the outlet port 29.

At the ends of the filter units are sleeves 30, 31 which are adapted to fit over the standpipes 24 and 25, respectively. It will thus be seen that a plurality of filter units may be stacked on the tubular standpipes 24 and 25, as shown in Fig. 1, and when thus assembled they may be securely held in place by the screw caps 32 and 33 screw-threaded onto the upper screw-threaded ends of the pipes 24 and 25 and closing the latter.

The pipes 24 and 25 are provided with a vertical series of openings 34, 35 which register respectively with the openings 21, 21 in the ends of the filter frames 14. The filtered oil may therefore flow from the upper or discharge sides of the filter elements 10 through the openings 19 and 20 in the knife edge transverse abutments 15 to the openings 21 and thence through the openings 34 and 35 into the tubes 24 and 25 to the chamber 28 at the bottom of the casing 22, as shown in Fig. 2, which is a cross-sectional view on the line 2—2 of Fig. 1, looking in the direction of the arrows. The chamber 28 may be a tubular passageway for receiving filtered oil simultaneously from both the pipes 24 and 25 for flow to the outlet port 29 at the bottom of the casing 22.

While the filter elements are supported mainly by the end sleeves or cylindrical collars 30, 31, they may also be supported on the upwardly projecting transverse, spaced-apart elongated knife edges 16. As shown in Fig. 1, a series of such knife edges 16' are provided for the lowermost filter element 10 of the lowermost filter unit. The uppermost filter unit may have the cross-bars flattened on their tops, as shown at 16" in Fig. 1.

While the spaced-apart elongated transverse knife edge supports 16 and 16' afford a distributed support for the lower sides of the filter units, their main purpose is to prevent buckling of the filter elements when in practical service. In other words, the knife edge supports below the filter elements and the knife edge abutments above the filter elements always keep the filter elements in their proper positions whether pressure is exerted on the lower or entrance sides of the filter elements during filtering operations, or whether pressure is exerted on the upper sides or discharge sides of the filter elements during the flushing or cleaning operation of the filtering apparatus.

It should be understood that when the filter units are mounted in the casing they are spaced from the walls thereof so that the liquid will be free to flow through the passageways shown at 36, 37 in Fig. 3. The stack of multiple filter units will be completely immersed in the oil in the casing 22, and when the pressure is exerted on the oil it will flow into the elongated chambers 38, 38 of all of the filter units in multiple. That is to say, since the ends of the chambers 38 are open adjacent the inner lateral walls of the casing the oil is free to flow into both ends of each chamber 38 simultaneously to distribute the liquid pressure equally over all of the bottoms of the various filter elements, thereby securing a uniform distribution of the filtering pressure and a rapid and uniform flow over a large area of the porous filter elements.

It should be understood that the fine particles of carbon and other material separated from the oil or other liquid being filtered need not be very frequently cleaned from the interior or entrance sides of the filter elements, because the collection and caking of such carbon or other fine particles forms in itself filtering layers and may be permitted to remain until the efficiency of the filtering apparatus is interfered with. So long as the layers of carbon or other fine material remain in porous condition and the heavier particles drop by gravity to the bottoms of the chambers 38, the filter elements are not deemed to be clogged. It should be particularly understood that the filter elements are not intended to be sufficiently porous to permit oil or other liquids to seep through the filter elements by gravity, but it is intended that pressure shall be exercised to force the liquid upwardly through the filter elements and therefore it will be evident that the pressure exerted will also force the oil through accumulated caked layers of carbon or other fine material so long as the caked layers remain sufficiently porous. These caked layers may be loosened and dropped to the bottoms of the chambers 38 by a reverse flushing operation by exerting liquid pressure through the outlet pipe 29 into the tubes 24, and thence to the upper or discharge sides of the filter elements and downwardly through the latter to loosen by force such caked layers of carbon and other foreign material.

When desired, however, the plate 39 may be removed from the large opening 40 in one side of the casing 22. By removing the face plate 39 from one side of the casing 22 the entire stack of filter units become accessible and so also all of the troughs between the knife edge support 16, and all of the under surfaces of the filter elements. It will thus be evident that by removing the plate 39, one entire side of the casing may be opened, exposing to view all of the filter units and all of the filter elements so that the bottoms of the filter elements may be mechanically cleaned and the accumulations of sludge or other filtered material may be scraped out of the troughs 38.

Obviously those skilled in the art may make various changes in the details and arrangement of parts without departing from the spirit and scope of our invention as defined by the claims hereto appended and we wish therefore not to be restricted to the precise construction herein disclosed.

Having thus fully disclosed an embodiment of our invention, what we desire to secure by Letters Patent of the United States is:

1. A filter unit comprising laminations of ribbon, a plurality of knife-edge supports for each ribbon, and means for mounting said knife-edge supports to direct liquid to be filtered to the entrance side of the filter.

2. In filtering apparatus, the combination with a plurality of filter units each comprising filter ribbons in laminations, of a frame for supporting each group of laminations, supporting means for stacking the filter units, and a plurality of knife edge supports on each of said frames for engaging and assisting in supporting the laminations on the next adjacent frame.

3. In filtering apparatus, the combination with a filter element comprising a stack of ribbon laminations, of means for holding the laminations compactly stacked, and means comprising knife-edged abutments engaging the outer face of the filter element to prevent the same from buckling.

4. In filtering apparatus, the combination with a filter element comprising a stack of ribbon laminations, of a holder therefor, a plurality of knife-edged abutments engaging the inside face and the outside face of the filter element to prevent the same from buckling.

5. In a filtering unit, the combination with a filter element comprising laminations of grooved ribbon, of a frame for holding said filter element, knife-edged abutments bearing against the inner face of said filter element, and means for directing filtered liquid from said filter element through said frame including passageways through said abutments.

6. In a filtering unit, the combination with a filter element comprising stacked laminations of filter ribbon, of a frame for holding the filter element intact, and a plurality of spaced-apart abutments on that side of said frame opposite said filter element, said abutments being adapted to bear against the outer face of another filter element comprising stacked laminations of filter ribbon.

7. A filter unit comprising a frame having spaced-apart abutments extending transversely on both sides thereof and a laminated filter element bearing against the abutments on the inside of said frame, the abutments on the outside of said frame being adapted to have set against the same a laminated filter element of an adjacent filter unit.

8. In filtering apparatus, the combination with a casing for containing liquid to be filtered, of spaced-apart pipes inside of the casing and secured thereto, a plurality of filter units each comprising a filter element and a holding cup therefor, sleeves at opposite ends of each filter unit fitting over said pipes and having delivery ports in registry with ports in said pipes when the filter units are mounted in stacked relation in said casing, and means for directing the liquid from the interior of the casing to the entrance sides of said filter elements and from the discharge sides thereof to said delivery ports for flow into said pipes.

9. In filtering apparatus, the combination with a plurality of filter units each comprising a porous filter element and a holding cup therefor, of spaced-apart supporting pipes each having a series of spaced-apart ports, sleeves at the ends of said cups provided with delivery ports to register with the ports in said pipes when the filter units are stacked on said pipes, screw-threaded caps at the ends of said pipes for closing the latter and at the same time clamp the filter units rigidly in stacked relation, and means for directing liquid to be filtered through said porous filter elements for flow through said delivery ports into said supporting pipes.

10. In filtering apparatus, the combination with a plurality of filter units each comprising a porous laminated filter element and a cup for holding the filter element rigid and solid, sleeves on said filter units, a pipe having a series of spaced-apart ports and being adapted to receive said sleeves, said sleeves having deliver ports in registry with the ports in said pipe when the filter units are mounted in stacked relation, means for securing the filter units rigidly in stacked relation, and means for directing liquid to the filter units to be filtered for flow through said ports after being filtered.

11. In filtering apparatus, the combination with a casing for containing liquid to be filtered, of a plurality of filter units each comprising a holding cup and a filter element therein composed of grooved laminated metal ribbon stacked very compactly, sleeves on said holding cups, a pipe for receiving said sleeves, means for holding said filter units in stacked relation with said sleeves on said pipe and ports in said sleeves in registry with ports in said pipe, abutments on the backs of the said cups for engaging the entry faces of said filter elements, and means for directing the liquid to be filtered to the entry sides of said filter elements for flow therethrough and for flow through said ports into said pipe.

12. In filtering apparatus, the combination with a casing containing liquid to be filtered, of spaced-apart pipes inside of the casing and secured thereto, a plurality of filter units each comprising a holding frame, spaced-apart sleeves on said holding frame adapted to be placed on said pipes to hold the filter units in stacked relation in said casing, means for securing the filter units rigidly in stacked relation, and means for directing liquid to the filter units and through the same into said pipes.

13. In filtering apparatus, the combination with a plurality of filter units each comprising a holding frame, of a pipe having a series of spaced-apart ports, sleeves connected to said holding frame and adapted to fit over said pipe and having delivery ports in registry with the ports in said pipes when the filter units are mounted in stacked relation, means for securing the filter units rigidly in stacked relation, and means for directing liquid to the filter units to be filtered for flow through said ports after being filtered.

14. In filtering apparatus, the combination with a filter element comprising a stack of ribbon laminations, of means for holding the laminations compactly stacked, and spaced-apart abutments on the back of said holding means in position to engage the outer face of another filter element transversely of the laminations thereof.

15. In filtering apparatus, the combination with a filter element comprising a stack of ribbon laminations, of a holder therefor, spaced-apart abutments on the inside of said holder for engaging the inner face of said filter element transversely of the laminations thereof, and spaced-apart abutments on the back of said holder adapted to engage the outer face of another filter element transversely of the laminations of said filter element.

16. In a filtering unit, the combination with a filter element comprising stacked laminations, of a holder therefor, and a plurality of spaced-apart abutments on the back of said holder in position to engage the outer face of a laminated filter element of a similar filtering unit.

17. In a filtering unit, the combination with a disk-like filter elements comprising laminations of metallic filter ribbon arranged so that the adjacent edges of the laminations comprise the opposite faces of the disk-like element, said ribbon being formed to provide capillary filtering passages between the faces of the ribbon, said passages opening into the opposite faces of the disk-like element, means for holding the filter elements intact, said means including a plurality of spaced-apart abutments adapted to bear against said opposite faces of the disk-like elements to prevent the same from buckling during filtering or back-washing.

18. A filter element comprising a supporting frame, a disk-like assembly of ribbon-like laminations pressed compactly together face to face, and held in said frame, the faces of said laminations providing therebetween a multitude of microscopic filtering passages opening on to the opposite faces of the disk, and means forming a plurality of supporting surfaces of minute area contacting with the opposite faces of the disk throughout its area for preventing the disk from buckling in either direction when liquid under very high pressure is forced therethrough in either direction.

19. In a filtering apparatus, the combination with a plurality of spaced apart frames connecting in parallel with a liquid flow conduit, each frame carrying a stack of metallic laminations providing opposed faces forming a series of parallelly arranged microscopic filtering passages, one of the ends of each of said passages connecting with said liquid flow conduit, and the opposite ends of said passages connecting with an internal passage disposed in each of said frames, and means forming a liquid flow conduit connecting with each of said internal passages of said frames, said frames having means for supporting the opposed faces of each stack of laminations from buckling in either direction during either filtering or backwashing operation.

20. In a filtering apparatus, the combination of a stack of frames, each frame holding a filter element comprising a stack of metallic laminations providing opposed surfaces providing a parallel series of microscopic liquid passages therebetween, each frame and filter having a separate liquid inlet and outlet compelling the passage of liquid through and between said laminations, and means for preventing the buckling of each lamination in either direction so as to support the same during filtering or backwashing operations.

PAUL B. RENFREW.
LEE R. HARTLEY.